(12) United States Patent
Pacilli et al.

(10) Patent No.: US 12,017,568 B2
(45) Date of Patent: Jun. 25, 2024

(54) FLEXIBLE PLENUM WITH RIGIDIFICATION FEATURES

(71) Applicant: GENTHERM INCORPORATED, Northville, MI (US)

(72) Inventors: Chad Vincent Pacilli, Windsor (CA); Wayne Swoyer Kauffman, III, Farmington Hills, MI (US)

(73) Assignee: GENTHERM INCORPORATED, Northville, MI (US)

( * ) Notice: Subject to any disclaimer, the term of this patent is extended or adjusted under 35 U.S.C. 154(b) by 608 days.

(21) Appl. No.: 17/283,595

(22) PCT Filed: Nov. 26, 2019

(86) PCT No.: PCT/US2019/063399
§ 371 (c)(1),
(2) Date: Apr. 8, 2021

(87) PCT Pub. No.: WO2020/117569
PCT Pub. Date: Jun. 11, 2020

(65) Prior Publication Data
US 2021/0339661 A1    Nov. 4, 2021

Related U.S. Application Data

(60) Provisional application No. 62/776,162, filed on Dec. 6, 2018.

(51) Int. Cl.
*B60N 2/56* (2006.01)
(52) U.S. Cl.
CPC .................................. *B60N 2/5642* (2013.01)

(58) Field of Classification Search
CPC ............................ B60N 2/5664; B60N 2/5642
(Continued)

(56) References Cited

U.S. PATENT DOCUMENTS

| 4,923,248 A | 5/1990 | Feher |
| 5,226,188 A * | 7/1993 | Liou ...................... A47C 7/742 |
| | | 5/653 |

(Continued)

FOREIGN PATENT DOCUMENTS

| CN | 102712275 A | 10/2012 |
| EP | 2368756 A2 | 9/2011 |
| WO | 2011/068684 A1 | 6/2011 |

OTHER PUBLICATIONS

International Search Report and Written Opinion for International Application PCT/US2019/063399; mailed on Apr. 3, 2020.
(Continued)

*Primary Examiner* — Avinash A Savani
*Assistant Examiner* — Dana K Tighe
(74) *Attorney, Agent, or Firm* — The Dobrusin Law Firm, P.C.

(57) ABSTRACT

An air distribution system that includes a plenum. The plenum has a top layer having one or more top layer corrugations; a bottom layer having one or more bottom layer corrugations; and an open space formed between the top layer and the bottom layer. The one or more top layer corrugations and the one or more bottom layer corrugations are spaced apart and oppose one another, and when the plenum flexes, the one or more top layer corrugations contact the one or more bottom layer corrugations.

20 Claims, 2 Drawing Sheets

(58) Field of Classification Search
USPC ............................................................ 454/120
See application file for complete search history.

(56) References Cited

U.S. PATENT DOCUMENTS

| | | | |
|---|---|---|---|
| 6,064,037 A | 5/2000 | Weiss et al. | |
| RE38,128 E | 6/2003 | Gallup et al. | |
| 6,629,724 B2 | 10/2003 | Ekern et al. | |
| 6,676,207 B2 | 1/2004 | Rauh et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,976,734 B2 | 12/2005 | Stoewe | |
| 7,083,227 B2 | 8/2006 | Brennan et al. | |
| 7,213,876 B2 | 5/2007 | Stoewe | |
| 7,338,117 B2 | 3/2008 | Iqbal et al. | |
| 7,356,912 B2 | 4/2008 | Iqbal et al. | |
| 7,475,938 B2 | 1/2009 | Stoewe et al. | |
| 7,506,938 B2 | 3/2009 | Brennan et al. | |
| 7,587,901 B2 | 9/2009 | Petrovski | |
| 8,454,094 B1* | 6/2013 | Boulware, Sr. | B60N 2/60 5/641 |
| 10,556,526 B2* | 2/2020 | Tait | B60N 2/5657 |
| 2004/0195064 A1 | 10/2004 | Tamada et al. | |
| 2005/0173950 A1 | 8/2005 | Bajic et al. | |
| 2009/0134675 A1* | 5/2009 | Pfahler | B60N 2/5635 454/120 |
| 2009/0218855 A1 | 9/2009 | Wolas | |
| 2010/0207443 A1 | 8/2010 | Brncick | |
| 2010/0327636 A1 | 12/2010 | Stoll et al. | |
| 2011/0227389 A1 | 9/2011 | Gomes et al. | |

OTHER PUBLICATIONS

Chinese Office Action dated Jul. 4, 2022, for Chinese Office Action 201980063123.0.

* cited by examiner

FLEXIBLE PLENUM WITH RIGIDIFICATION FEATURES

PRIORITY

This application claims the benefit of U.S. 62/776,162 filed Dec. 6, 2018, the entire contents of which is incorporated by reference herein for all purposes.

FIELD

These teachings relate generally an air distribution system, and more particularly to a plenum that connects a blower to a cushion of a vehicle seat and assists in distributing fluid to areas of a vehicle seat such as a bolster and/or leg region.

BACKGROUND

For many years, industry has been concerned with designing improved conditioning systems for articles of manufacture such as seats, steering wheels, automotive vehicles, or other transportation vehicles. Examples of such conditioning systems are disclosed in U.S. Patent Application Publication No. 2010/0327636, which are expressly incorporated herein by reference for all purposes. Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower. Some systems have attempted to connect a blower and insert to a back side of a seat and distribute fluid from the back side of the seat.

What is needed is an air distribution system that connects to a back side of a cushion and the plenum is flexible to move with the cushion or to conform to the shape of the cushion. What is needed is a plenum with rigidification features that assist in maintaining an open space within the plenum. It would be desirable to have a plenum with rigidification features that act as baffles to control flow of a fluid within the plenum. What is needed is a plenum with a top wall and a bottom wall that are movable relative to each other and are supported by rigidification features of the top wall and the bottom wall.

SUMMARY

The present teachings are directed to an air distribution system that includes a plenum. The plenum has a top layer having one or more top layer corrugations; a bottom layer having one or more bottom layer corrugations; and an open space formed between the top layer and the bottom layer. The one or more top layer corrugations and the one or more bottom layer corrugations are spaced apart and oppose one another, and when the plenum flexes, the one or more top layer corrugations contact the one or more bottom layer corrugations.

The present teachings include: a distribution system comprising: one or more plenums each including: (i) a top layer having one or more corrugations; (ii) a bottom layer having one or more corrugations; and (iii) an open space formed between the top layer and the bottom layer; and wherein the one or more corrugations of the top layer and the one or more corrugations of the bottom layer are spaced apart and oppose one another so that when the one or more plenums flex the one or more corrugations of the top layer contact the one or more corrugations of the bottom layer the open space is maintained.

The present teachings provide an air distribution system that connects to a back side of a cushion and the plenum is flexible to move with the cushion or to conform to the shape of the cushion. The present teachings provide a plenum with rigidification features that assist in maintaining an open space within the plenum. The present teachings provide a plenum with rigidification features that act as baffles to control flow of a fluid within the plenum. The present teachings provide a plenum with a top wall and a bottom wall that are movable relative to each other and are supported by rigidification features of the top wall and the bottom wall.

The plenum is flexible to contour to a shape of a seat or movement of a user but includes one or more rigidification features that assist in maintaining an open space within the plenum.

An air distribution system that includes a plenum. The plenum has a top layer having one or more top layer corrugations: a bottom layer having one or more bottom layer corrugations; and an open space formed between the top layer and the bottom layer. The one or more top layer corrugations and the one or more bottom layer corrugations are spaced apart and oppose one another, and when the plenum flexes, the one or more top layer corrugations contact the one or more bottom layer corrugations.

DETAILED DESCRIPTION

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all-terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g. cloth, leather, synthetic leather, or the like) and under a cushion or backrest (e.g. a foam support for the user). Preferably, all or a portion of the conditioning seat is located between a cushion and a frame of a vehicle seat. In one aspect, the present teachings employ a structure that makes it particularly suited for use beneath a perforated leather seat cover or perforated synthetic leather seat cover. The present conditioning system is particularly attractive for use in combination with a conditioned seat (e.g. a ventilated, actively cooled (such as by use of a thermoelectric device or module), or actively heated seat). The conditioning system may be integrated with the seat foam support by way of moulding, gluing, or other attachment methods. Preferably, the conditioning system includes a distribution system and the distribution system is connected to a seat suspension without use of any adhesives, gluing, or both. More preferably, the conditioning system is included underneath the cushion of the seat and the cushion assists in distributing air from the conditioning system to an occupant, predetermined locations, or both. The conditioning system may include one or more blowers and one or more inserts (i.e., plenums); one or more heaters, one or more thermoelectric devices, or a combination thereof.

A conditioned seat may include one or more air movers (air movers and blowers are used interchangeably herein). The one or more air movers may move air through one or more inserts that are located within or are located behind the backrest cushion, seat cushion, or both. The one or more plenums may distribute the air from the air mover. The one or more air movers may be an axial fan, a radial fan, or both. Preferably, the one or more air movers are a radial fan. The one or more air movers may include a Thermoelectric Device (TED). The TED may heat air as air enters the air mover or as air leaves the air mover. The TED may cool air as the air enters the air mover or as the air leaves the air mover. The one or more air movers may include a heating device, a cooling device, or both (i.e. a thermoelectric device (TED)). The TED may be used to heat air and/or cool air that is blown onto the user. The air mover and TED may be placed in the seat in many different configurations or in communication with a vehicle seat insert. For example, the TED and/or air mover may be used in any manner or any configuration with an insert described in any of U.S. Pat. Nos. RE38,123; 4,923,248; 6,629,724; 6,676,207; 6,857, 697; 6,869,139; 6,869,140; 6,976,734; 7,083,227; 7,213, 876; 7,338,117; 7,356,912; 7,475,938; 7,506,938; and 7,587, 901 or U.S. Patent Application Publication No. 2009-0218855 the teachings of which are expressly incorporated by reference herein for all purposes. The TED and heater may both produce heat at the same time; however, the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g. trim layer), holes or perforations in a cushion, or a combination thereof. In some examples, air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating. The plenum may include cutouts, internal slits, external slits, voids, apertures, carrier configuration, or the like may be shaped similarly or be aligned with the perforations in the seat cover, the cushion, or both.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may be made of foam (e.g., open cell or closed cell). The cushion may be an open cell foam that is covered with a liner that prevents air from passing through the cushion. The cushion may include one or more cushion holes. The cushion may include a plurality of cushion holes that permit air to move between a top and rear of the cushion. The cushion may be connected to or part of a conditioning system, support, a seat suspension, or a combination thereof. An occupant sensor may extend over the cushion, all or a portion of the conditioning system, or both.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. A microprocessor may monitor the occupant senor for a passenger. For example, the microprocessor may be attached to an occupant senor and when the occupant senor measures that the seat is free of an occupant the conditioning system may remain off even if all of the other conditions are met such as the conditioning system being turned on. The occupant sensor may be in contact with a plenum. Preferably, the occupant sensor is located on a top of a cushion and the plenum is located under the cushion. The conditioning system may include one or more distributions systems.

The one or more air distribution systems function to guide a fluid towards or away from an occupant contact region. The air distribution system may also be referred to herein as a distribution system. The one or more air distribution systems, preferably are located in a bun, a backrest, or both of a vehicle seat. The one or more distribution systems may direct a fluid from a blower to an occupant, from an occupant to a blower, or being switchable therebetween. The distribution system may have a portion that is located on a rear side of the cushion, a portion located on a top of a cushion, a portion that extends between the cushion, or a combination thereof. The distribution system may be a plenum and a blower. The distribution system may use a portion of a cushion, the trim layer, or both to distribute air. Preferably, all of the distribution system may be located along a rear side of a cushion. The distribution system may include one or more blowers, one or more plenums, or both.

The plenum may function to connect to a cushion and assist in transporting fluid through the cushion. The plenum may function to distribute fluid across an area so that fluid is moved between an occupant and a blower. Preferably, the plenum functions to connect itself and a blower to a rear side of a cushion. The plenum may be an insert, a bag, or both. The plenum may include open edges. The plenum may be two or more pieces connected together. The plenum may be a single piece. The plenum may be created by forming two or more separate pieces or a single piece. The plenum may be created by forming one or more corrugations in each piece of plenum. Each layer of the plenum may include a plurality of corrugations and the corrugations may oppose each other to form one or more open spaces through the plenum. The plurality of corrugations may be spaced apart from one another and may oppose one or more corrugations on an opposing layer. The plenum may be created by forming two or more separate pieces, forming baffles, corrugations, or both in each of the two or more separate pieces, and opposing the baffles, corrugations, or both of one separate piece to the opposing separate piece. An edge of one separate piece may be connected to an edge of a second separate piece to form a seam. The plenum may be formed by blow molding, injection molding, thermoforming, extrusion blow molding, vacuum molding, compression molding, or a combination thereof. The one or more pieces of the plenum may be connected by welding (e.g., ultrasonic welding, heat sealing extrusion welding, hot plate welding, heat staking, etc.), adhesive (e.g., epoxy, glue, peel and stick film, two sided tape, a dry adhesive that is curable (e.g., moisture cured, uv cured, pressure cured, heat cured), etc.), flanges, a mechanical fastener (e.g., stapling, sewing, rivets) or a combination thereof. The plenum may be any shape that promotes the flow of air. The plenum may include one or more peripheries.

A periphery may be an external boundary of one or more pieces of the plenum. The periphery may include a peripheral edge. The peripheral edge may be a continuous peripheral edge (e.g., a circle or oval). The peripheral edge may be made up of two or more edges connected together (e.g., a crescent or almond). The peripheral edge may be made up of three or more edges connected together (e.g., a triangle). The peripheral edge may be made up four or more peripheral edges connected together (e.g., a square, rectangle, or diamond). The peripheral edge may be made of five or more sides (e.g., a pentagon). The peripheral edges may have rotational symmetry. The peripheral edges may not have rotational symmetry. The peripheral edges may be connected together to form a seam that prevents a fluid from exiting from between the top layer and the bottom layer. The top layer, the bottom layer, a connection layer, or a combination thereof may include one or more peripheries. The top layer and the bottom layer only connect at the one or more peripheries so that an open space is maintained between the top layer and the bottom layer. The plenum may have a back side, a front side, a first side, and second side. The width of the back side and front side may be the same or either side may be wider than the other. The back side of the plenum may be closest to the bite line of the seat. The bite line of the seat is where the backrest cushion and leg-rest cushion meet. The back side may be substantially straight, curved, angled, concave, convex, serpentine, rounded, or a combination thereof. The front side of the plenum may be closest to a user's knees or head when located within a seat. The front side may be substantially straight, curved, angled, concave, convex, serpentine, rounded, shaped to the user's legs, or any combination thereof. The front side, the rear side, or both may extend at an angle relative to the first side, the second side, or both. Preferably, the first side and the second side are perpendicular to the front side, the rear side, or both. The first side and second side may be substantially straight, curved, angled, concave, convex, serpentine, rounded, or any combination thereof. The first side and second side may be parallel. Preferably, the first side and second side are mirror images of each other. For example, the first side and second side may be concave to promote laminar flow between the blower and the ventilation holes. The plenum may include one or more top layers and one or more bottom layers with one or more insert layers or spacer layers extending between the one or more top layers and the one or more bottom layers. The insert layers or spacer layers may extend between the top layer and the bottom layer and assist in maintaining an open space between the top layer and the bottom layer. The spacer layer may be a miller textile available from Muller. The plenum may be free of an insert layer, a spacer layer, or both. The open space may be maintained by the corrugations, the baffles, or both. The plenum may include one or more holes in the one or more top layers, one or more bottom layers, or both. The plenum may receive air from an air mover and distribute the air to predetermined locations. The plenum may receive air from holes in the cushion and move the air to the blower. The plenum may house an open space. The plenum may resist crushing when an occupant sits in a vehicle seat. For example, the plenum may not completely seal off and air may flow through an entire volume of the plenum. The plenum may have an open space that is self-supporting. The plenum may have an open space that is free of additional material to maintain the openness of the open space. The plenum may include one or more baffles that assist in directing the flow of air to the ventilation holes. The plenum may be made of or include a polymer, plastic, metal, a thermoset, an elastomer, high density polyethylene (HDPE); acrylonitrile butadiene styrene (ABS), or a combination thereof. The material of the plenum may be elastically deformable. The material of the plenum may be plastically deformable. The material of the plenum may be rigid. The material of the plenum may be rigid and corrugations may be introduced into the plenum so that the plenum may be movable. For example, the corrugations. The plenum may be positioned substantially between one or more bolsters.

The one or more bolsters function to support the occupant when sitting on the cushion, prevent movement of an occupant: within a vehicle seat, or both. The bolsters may extend out of a plane of a cushion of a vehicle seat. The bolsters may extend within a plane that extends at an angle relative to a plane of the cushion. The bolsters may attach to the plenum on the B-side of the bolster. The bolster may be positioned so that the plenum may curve around the cushion before attaching to the B-side of the bolster. The bolster may be made of the same material as the cushion. The bolster may be made of a different material than the cushion. The bottom layer of a plenum may be opposite the bolsters, the cushion, or both.

The bottom layer may function to allow air to enter into the plenum and to direct air towards exit locations. The bottom layer may connect to a blower. The bottom layer and the top layer may extend outward from a main body portion of the plenum forming a tail that connects the blower to the plenum. The tail may allow the blower to be located distal from a body of the plenum. The bottom layer may be permeable. Preferably, the bottom layer may be impermeable, include an impermeable coating, or both. The bottom layer may be a porous material. The bottom layer may be solid. The bottom layer may be made of a polymeric material. The bottom layer and the top layer may be made of the same material as the plenum as is discussed herein and the materials are incorporated by reference herein for the top layer and the bottom layer. The bottom layer and the top layer may be one co-created piece. The bottom layer and the top layer may be formed separately and then connected together as is discussed herein. The bottom layer may be one or more layers. Preferably, the bottom layer is a single layer. The bottom layer may include one or more recesses that are in communication with one or more blowers. The bottom layer may include one or more connection recesses that assist in connecting the blower to the plenum. The blower may be attached to the connection recess.

The open space may function to create an open area between the top layer and the bottom layer. The open space may allow fluid to pass between the bottom layer and the top layer. The open space may be free of additional material (e.g., a spacer layer). The open space may include a spacer layer. The open space may be formed by the one or more corrugations resisting on an opposing one or more corrugations. For example, a corrugation of a top layer may be in contact with a corrugation with a bottom layer to form an open space. The open space may be an absence of material that is located between the top layer and the bottom layer. The open space may include one or more features such as a baffle, corrugations, or a connection layer that extend therethrough. A height of the open space may be created by the baffles, corrugations, or both supporting the top layer and the bottom layer. A plurality of open spaces may be formed by a plurality of baffles, corrugations, or both extending along all or a portion of a length of the plenum, top layer, bottom layer, or a combination thereof. The one or more corrugations of the top layer and the bottom layer may move into contact to create a baffle. The channels, the baffles, the corrugations, or a combination thereof of the top layer, the bottom layer, or both may have a beginning end, a terminal end, or both. The beginning end may be located substantially near the connection recess. The terminal end may be located proximate to or at a terminal edge. The one or more channels, the one or more baffles, or both may be substantially parallel to each other along the longitudinal axis. The baffles, the one or more corrugations, or both may form one or more channels.

The one or more baffles may function to distribute air within the open space, distribute air to the ventilation holes, provide uniform distribution of air, or a combination thereof. The one or more baffles may create a path or passageway between the one or more ventilation holes and the blower so that fluid passes through each of the ventilation holes and not only the holes closest to the blower. The one or more baffles may separate the plenum into one or more zones. The one or more baffles may be a portion of the top layer, the bottom layer, or both that extend into the open space to create a fluid barrier. The baffles may be a separate piece that is inserted between the top layer and the bottom layer to direct fluid within the plenum. The one or more baffles may be added into the open space before the plenum is sealed. The one or more baffles may be curved, substantially straight, teardrop shaped, crescent shaped, serpentine shaped, have a curved portion, have a straight portion, or a combination thereof. The baffles may be rounded on either end. The tear drop baffles are defined as a baffle with a body that decrease in width from one end to the other end. The baffles that are tear drop shaped may have sides that are substantially straight, concave, convex, curved, or any combination thereof. For example, the teardrop shaped baffle may have substantially straight sides with rounded ends. For example, the teardrop shaped baffle may have a middle body that is less in diameter than either end of the baffle. The one or more baffles may radiate outwards away from the blower attachment feature. The one or more baffles may be located proximate to the blower attachment feature and assist in facilitating air between the blower and the one or more ventilation holes. For example, the baffles may assist the blower in moving equal amounts of air through a ventilation hole that is located within 10 cm of the blower and a ventilation hole that is between 25 cm and 40 cm away. The one or more baffles may be shaped in a way to assist the flow of air from the blower to the one or more ventilation holes in an even fluid speed. The one or more baffles may have a shape to promote laminar flow. The baffles may be generally straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. The one or more baffles may be configured to prevent turbulent flow. For example, the baffles may be straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. For example, the baffles may increase in cross-sectional width as air moves away from the connection recess. For example, the baffles may increase in cross-sectional width as air moves towards to the connection recess. Preferably, the plenum includes a plurality of baffles and each of the plurality of baffles are substantially parallel to one another (e.g., within an angle of about 5 degrees or less from parallel). The one or more baffles may be part of the corrugation or the corrugations may act as a baffle. The one or more baffles may be formed within the top layer, the bottom layer, or both when the top layer, the bottom layer, or both are created. For example, if the top layer is vacuum molded the baffles may be vacuum molded into the top layer when the top layer is formed. The one or more baffles may be connected within the plenum by one or more connection layers.

The one or more connection layers may function to connect two or more parts of the plenum together, connect a baffle to a top layer, a bottom layer, or both, connect one part to itself, or a combination thereof. The one or more baffles may be connected by a connection layer. The one or more connection layers may function to connect the top layer, the bottom layer, or both so that a seam is formed and the open space is not closed off. The one or more connection layers may be an integral part of the top layer, the bottom layer, or both. For example, if the connection is formed by heat staking then the top layer, bottom layer, or both may be melted so that the top layer and the bottom layer are fixed together. The connection layer may be added after the top layer, the bottom layer, or both are created. The connection layer may be formed at the same time as the top and bottom layer. The connection layer may be added or formed by welding, ultrasonic welding, adhesive, or a combination thereof. Preferably, the connection layer extends between the top layer and the bottom layer. The connection layer may be glue, a peel and stick layer, a solid adhesive that is moisture cured, a solid adhesive that is UV cured, a solid adhesive that is heat cured, or a combination thereof. The connection layer may assist in forming one or more seams. The connection layer may connect one or more layers together to form a seam along one or more edges and preferably to form a peripheral edge. The connection layer may be located at a terminal edge or along one or more edge regions of the plenum.

The terminal edge functions as an outer periphery of the plenum. The terminal edge denotes an end of a top layer, a bottom layer, seam, or a combination thereof of the plenum. The terminal edge may be Where the top layer, the bottom layer, and the connection layer meet. The terminal edge may be where the corrugation channels end. The terminal edge may be pointed, rounded, jagged, substantially straight, curved, serpentine, or a combination thereof. The terminal edge may attach to the cushion or bolster. The terminal edge may be a farthest edge of the plenum from the connection recess. The terminal edge may be at a position where the top layer and bottom layer meet.

The top layer may function to assist in distributing air flow to predetermined locations. The top layer may function to be one half of an air impermeable layer. The top layer may be made of an air permeable layer. The top layer may be made of an air impermeable material that prevents an escape of fluid from the plenum except from predetermined locations (e.g., a recess or ventilation holes). The top layer may include one or more ventilation holes. The top layer may include a plurality of ventilation holes. The one or more ventilation holes may be aligned with cushion holes in a cushion. The one or more ventilation holes may distribute air between the plenum and locations that correspond with regions of an occupant (e.g., lower back or legs). The one or more ventilation holes may be an absence of material. The one or more ventilation holes may be formed by removing material. The one or more ventilation holes may be formed by cutting the top layer. The one or more ventilation holes may be located between the one or more corrugations of the top layer. The one or more ventilation holes may be located within the one or more channels. The top layer and the bottom layer may be connected together around edges to form a seam or a connection. The top layer and bottom layer may be ultrasonically bonded together, melted together, glued together, heat staked, connected by a connection layer, or a combination thereof. The top layer, bottom layer, or both may include one or more contours. The top layer and the bottom layer may each include one or more corrugations that form one or more corrugation channels therebetween.

The corrugation channel functions to facilitate air flow between the ventilation holes and the connection recess. The corrugation channels may be formed when the corrugations make contact during flexing of the top layer, bottom layer, or both. The corrugation channels may have a symmetrical cross-section. The corrugation channels may have an asymmetrical cross-section. The corrugation channels may be substantially parallel with the peripheral edges of the plenum. The corrugation channels may be substantially parallel to each other along the longitudinal axis. The corrugation channels may radiate away from the connection recess. The corrugation channels may be spaced along a longitudinal axis. The corrugation channels may begin substantially near the connection recess and have a terminal end at or near the terminal edge of the plenum. The corrugation channel may have a cross-section that is trapezoidal, rectangular, triangular, octagonal, pentagonal, diamond, heptagonal, parabolic, circular, or any combination thereof. The corrugation channels may be proximate to the ventilation holes or in fluid commination with the ventilation holes.

The one or more ventilation holes may function to align a plenum with a cushion, to connect a plenum to a cushion, or both. The one or more ventilation holes may extend through any portion of the plenum. The one or more ventilation holes may extend through a seam, extra material, an ear along one or more edges of the plenum, or a combination thereof. Preferably, the one or more ventilation holes extend through the top layer of the plenum. The one or more ventilation holes may be used to align the plenum with the cushion, holes in the cushion, or both. The one or more ventilation holes may be free of connection and may be used for alignment by temporarily being contacted during attachment. Preferably, the one or more ventilation holes assist in connecting the plenum to the cushion. The plenum may be connected (e.g., via an adhesive or mechanical fastener) to the cushion or a seat frame. Preferably, the plenum is free of an adhesive connection to the cushion. The ventilation holes may extend axially outward from the top layer of the plenum. The one or more ventilation holes may be different diameters relative to another ventilation hole to assist with optimal air flow between the blower and the seat cushion. The ventilation holes may include one or more ducts.

The one or more ducts may function to extend into one or more cushion holes. The one or more ducts may assist in creating a connection with the cushion holes. The one or more ducts may have a cross-sectional length that is greater than a cross-sectional length of the cushion holes. The ducts may create a friction fit with the cushion holes. The ducts may have an angle that is "steeper" than an angle of the cushion holes. The ducts may have one or more barbs that grip the cushion. The ducts may create a friction fit, a seal, or both with the cushion so that air is transferred between the plenum and the cushion. The duct may have a cross-section that is cylindrical, conical, parabolic, decreasing in diameter, increasing in diameter, or a combination thereof. The plenum may include one or more connection recesses so that the plenum connects to a blower and the plenum connects to a cushion.

The one or more connection recesses function to connect to one or more connection features. The one or more connection recesses may be a through hole in the plenum that receives a portion of the blower so that the blower connects to the plenum. The one or more connection recesses may each be located entirely located within a corrugation channel. The one or more connection recesses may be located within two or more corrugation channels. The connection recess may be free of communication with any corrugation channels. For example, the corrugation channels may approach the connection recess but may stop before the corrugation channel. The connection recess may be above the blower and the blower may be suspended below the connection recess.

The blower functions to push air, pull air, or both. The blower may be movable with the cushion, the plenum, or both as an occupant sits on the cushion or leaves the cushion. The blower may include an opposite mating feature to the connection recess. The blower may be an axial fan. Preferably, the blower may be a radial fan. Blower, air mover, and fan as discussed herein may be used interchangeably. The blower may include one or more impellers that move air through the blower, the blower housing, the plenum, or a combination thereof. The blower includes an inlet and an outlet. The inlet may be on the bottom side or the top side. Preferably, the inlet is in the bottom side of the blower. The inlet or the outlet is connected to the plenum via the attachment ring, a clip, a connection recess, or a combination thereof. The inlet and outlet may allow air to move into and out of the housing. The movement of air from or to the blower may be facilitated by the one or more corrugations.

The one or more corrugations may function to maintain an open space when the top layer, the bottom layer, or both move (e.g., flex, compress, or both). The one or more corrugations of the top layer and the one or more corrugations of the bottom layer may maintain the open space between the one or more ventilation holes and the connection recess. The one or more corrugations on the top layer and bottom layer may essentially stack when the top layer, the bottom layer, or both are moved towards each other. The one or more corrugations may mate when the top layer, bottom layer, or both are moved. The one or more corrugations may stack when the top layer and the bottom layer are moved into contact, the corrugations are moved into contact, or a combination of both. The one or more corrugations may be flexible. The one or more corrugations may impart flexibility into the top layer, the bottom layer, or both so that the top layer, the bottom layer, or both may flex, move, bend, or a combination thereof. The one or more corrugations may be stiff or rigid. The one or more corrugations of the top layer may be more rigid than the bottom layer or vice versa. For example, if the top layer is more rigid than the bottom layer the rigidity of the top layer may assist the bottom layer is flexing about the cushion, in a predetermined direction, or both. The one or more corrugations may impart stiffness to the top layer, the bottom layer, or both in one direction and flexibility in a second direction. For example, the corrugations may impart stiffness along a longitudinal axis of the corrugations, plenum, or both and may impart flexibility along the lateral axis of the corrugations, plenum, or both. The one or more corrugations may permit the entire plenum to curve so that the plenum conforms to the cushion, bolsters, or both. The one or more corrugations may be formed into a layer (e.g., top layer and/or bottom layer). The one or more corrugations may be a projection from a layer. The one or more corrugations may have two opposing walls that extend outward from the layer but are integrally connected to the layer. The two opposing walls may move relative to each other. The two opposing walls may be spaced apart and the space between the two opposing walls may be an absence of material. The two opposing walls may move towards or away from each other as the layer moves, bends, flexes, or a combination thereof. The corrugations may be formed by folding layer, stamping a layer, creating a crease in a layer, or a combination thereof. The one or more corrugations may be thrilled when a layer is formed. The one or more corrugations (e.g., of the top layer, the bottom layer, or both) may have a cross-sectional shape of a "U" shaped, trapezoidal, have pointed edge, rounded edge, flat surface, terminate at a point, triangle, rectangle, octagon, trapezoid, parabola, or a combination thereof. Preferably the suspension corrugation terminates at a point and the support corrugation has a planar surface. For example, the corrugation on the top layer may have a different cross-sectional shape compared to the corrugation of the bottom layer. The one or more corrugations may have substantially rounded edges, pointed edges, or a combination thereof. The one or more corrugations may terminate at a point may be planar; may be rounded; or a combination thereof. The one or more corrugations on the top layer, the bottom layer, or both may be separate or may be touching when the distribution system is in use. Preferably, a corrugation of a top layer may touch a corrugation of a bottom layer to form a corrugation channel there between, to support a space between the top layer and the bottom layer, or both. The one or more corrugations may function as baffles. The one or more corrugations may form corrugation channels when in contact. The one or more corrugations may be a suspension corrugation, a support corrugation, or both.

The one or more suspension corrugations function to maintain an open space when the top layer, the bottom layer, or both flex. The one or more suspension corrugations may contact an opposing suspension corrugation or an opposing support corrugation to create, maintain, or both an open space. The top layer, the bottom layer, or both may include a plurality of suspension corrugations. Preferably, the top layer includes the suspension corrugation. The top layer, the bottom layer, or both may include 5 or more 7 or more, 10 or more, 15 or more, or even 20 or more suspension corrugations. The one or more suspension corrugations may be substantially pointed or substantially rounded. The one or more suspension corrugations may have a cross section of a "U" shaped, trapezoidal, have pointed edge, rounded edge, flat surface, terminate at a point, triangle, pentagon, heptagon, or a combination thereof. The suspension portion may have a point that forms a line that extends in a longitudinal direction (e.g., and when in contact has line contact). The one or more suspension corrugations may pivot on top of the one or more support corrugations when the top layer, the bottom layer, or both move or flex. The one or more suspension corrugations may be included in the top layer and the bottom layer so that they may align together and form a corrugation channel. For example, the one or more suspension corrugations may oppose each other on the top layer and the bottom layer, make contact; and align side by side when the top layer, the bottom layer, or both flex. The suspension corrugation may extend from the top layer or the bottom layer into contact with an opposing support corrugation. The suspension corrugation may be movable about the support corrugation. For example, the support corrugation may have a larger surface area than the suspension corrugation and the suspension corrugation may move about the support corrugation without leaving the support corrugation. The suspension corrugation may pivot about the support corrugation. The suspension corrugation may extend from only the top layer and the bottom layer may be a support corrugation. The suspension corrugation may be located opposite another suspension corrugation. Preferably, a suspension corrugation may always be located opposite a support corrugation. The suspension corrugation may make line contact with the support corrugation.

The one or more support corrugations function to maintain an open space when the top layer, the bottom layer, or both flex, move, a force is applied to the plenum, or a combination thereof. The top layer, the bottom layer, or both may include One or more support corrugations. Preferably, the bottom layer includes support corrugation. The top layer, the bottom layer, or both may include 5 or more, 7 or more, 10 or more, 15 or more, or even 20 or more support corrugations. The top layer and the bottom layer may include one or more support corrugations. For example, the top layer may include one or more support corrugation and the bottom layer may include one or more support corrugation and both layers of the one or more support corrugations may oppose each other. For example, the opposing one or more support corrugations may form a corrugation channel as the top layer, the bottom layer, or both flex or move. The one or more support corrugations may be any shape that has a planar terminal end, a region that extends parallel to the top layer, the bottom layer, or a combination thereof. The one or more suspension corrugations may have a cross section of a "U" shaped, trapezoidal, have pointed edge, rounded edge, flat surface, terminate at a point, triangle, pentagon, heptagon, or a combination thereof. Preferably, the one or more support corrugations have a planar surface. The suspension corrugations may be movable about or along the support corrugations. The support corrugations may be larger than the suspension corrugations. The cross-sectional shape of the one or more support corrugations may be half trapezoidal, half rectangular, half octagonal, or a combination thereof. Half octagonal means that the terminal end is planar, all edges of the cross-section are equal in length, and the layer has 4 walls that combine together to form the support corrugation. The terminal end of the support corrugation may have an area (e.g., a length and a width). The terminal end of the support corrugation may not be a line. The terminal end may have a sufficient area to receive a suspension corrugation that is movable about the area of the support corrugation. The one or more support corrugations may be flexible. For example, the support corrugation may move or bend so that the layers may move. The one or more support corrugations may be rigid. For example, the support corrugations may maintain a shape of a layer and the region between the support corrugations may flex, move, bend, or a combination thereof. A break (e.g., a fold of the corrugation) of the support corrugation may permit a layer to flex, move, bend, or a combination thereof. Movement of a top layer towards or away from a bottom layer may cause the flexing, bending, movement, or a combination thereof of the top layer, the bottom layer, or both. The one or more support corrugations may be a surface that supports the point on the suspension corrugations as the top layer, the bottom layer, or both flex. For example, the one or more support corrugations of the bottom layer may support one or more support corrugations of the top layer such that the one or more corrugations of the top layer are angled on top of the one or more corrugations of the bottom layer. The one or more support corrugations on the top layer and the one or more corrugations on the bottom layer may lay flat on top of each other at the planar surface. The one or more support corrugations may maintain an open space when the cushion is in use by an occupant.

The one or more cushions may function to support an occupant, a conditioning system, or both. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a plenum, a blower, or a combination thereof. The cushion may include one or more supports, one or more seat suspensions, or both that assist in connecting a plenum, a blower, or both to the cushion.

The one or more supports may function to create an anchor for one or more blowers, one or more plenums, or both. The one or more supports may be formed into the cushion. The one or more supports may be installed in the cushion while the cushion is being formed. The one or more supports may be connected to a vehicle. The one or more supports may assist in supporting a seat suspension.

The one or more seat suspensions may be installed before cushion. The seat suspension may include a wire frame, a plate frame, or both. The seat suspension may support the plenum. The plenum may be located between the seat suspension and the cushion. The blower may be located between the seat suspension and the plenum. The seat suspension may be located between the blower and the plenum. The seat suspension may be located on a rear side of a cushion.

The rear of the cushion is where the plenum connects to the cushion. The rear side may have connection features for attaching to the plenum. The rear side may house a cushion hole. The rear side may be planar, irregular, curved, or a combination thereof in order to connect with the plenum.

Figure 1:
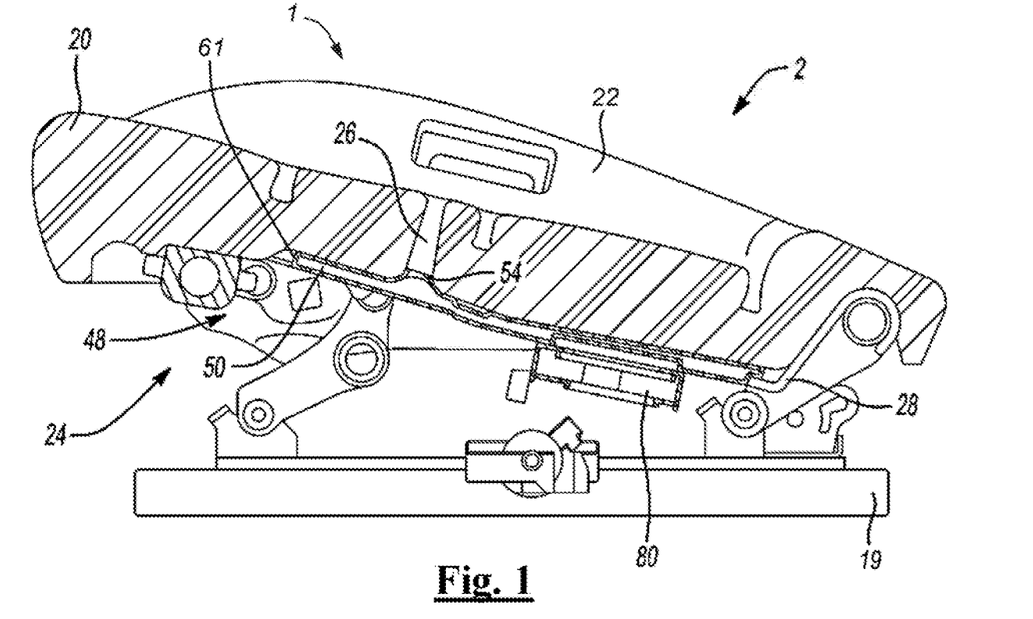
FIG. 1 is a side view of an air distribution system connected to a cushion of a vehicle seat and supported by the seat suspension.

FIG. 1 illustrates a side view of a portion of a vehicle seat 1 that includes a conditioner or conditioning system 2 including an air distribution system 48 and a cushion 20. The cushion 20 includes a support portion 22 or a-side, a rear side 24 or b-side or b-surface, and one or more cushion holes 26 that extend through a thickness of the cushion 20. The air distribution system 48 includes a plenum 50 that is to, in contact with, or rests upon the bottom or b-side 24 of the cushion, to a seat suspension 28 of the seat 1, or a seat support 19 that is connected to a vehicle. The plenum 50 comprises one or more ventilation holes 54 that are at least partially aligned with or in fluid communication with the one or more cushion holes 26. The air distribution system 48 includes a blower 80 is connected to the plenum 50. The plenum 50 includes a terminal edge 61 which denotes the farthest periphery from the connection recess 60 (FIG. 2) and the blower 80. During use, the blower 80 is configured to move air between an occupant in the seat 1 or cushion 20 and the blower 80 via the plenum 50, the one or more ventilation holes 54, and the one or more cushion holes 26.

Figure 2:
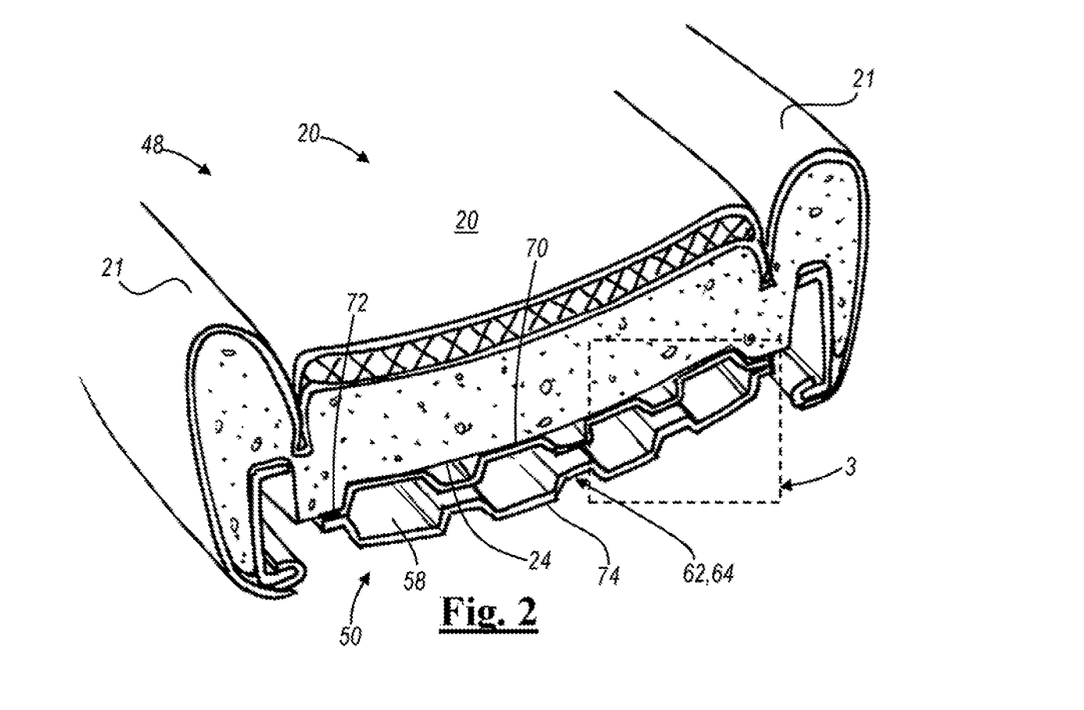
FIG. 2 is cross-sectional view of a cushion of a vehicle seat and a distribution system connected to the vehicle seat.

FIG. 2 is a cross-sectional view of a cushion 20 and plenum 50. The cushion 20 includes a support portion 22 and bolsters 21. The air distribution system 48 includes the plenum 50 connected to the cushion 20 at the rear or b-surface 24 of the cushion 20. The plenum 50 includes a top layer or top surface 70 and an opposing bottom layer or bottom surface 74. The top layer 70 is attached to the bottom layer 74 by a connection layer 72. The top layer 70 and bottom layer 74 include baffles 62 and corrugations 64. The corrugations 64 are configured to maintain an open space 58 between the a top layer 70 and the bottom layer 74 when the top layer 70, the bottom layer 74, or both bend, flex, or otherwise move. The baffles 62 facilitate fluid to flow between the one or more corrugations. The top layer 70, bottom layer 74, baffles 62, and corrugations 64 maintain an open space 58 defined between the top layer 70 and the bottom layer 74.

Figure 3:
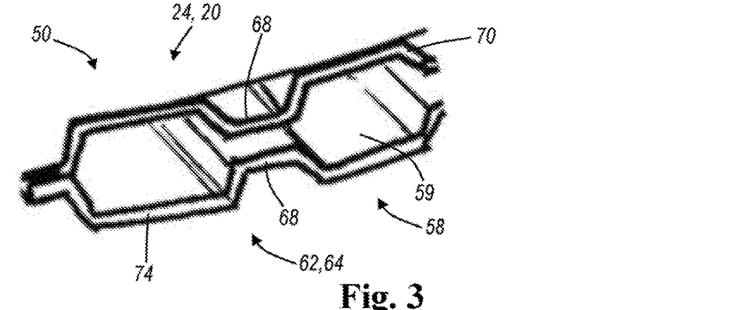
FIG. 3 is a close-up view of the cushion and the plenum of the air distribution system in box 3 in FIG. 2.

FIG. 3 is a close-up view of the plenum 50 and the cushion 20 taken at box 3 of FIG. 2. The top layer or surface 70 of the plenum 50 is connected, attached to, or in contact with the rear or bottom or b-side 24 of the cushion 20. The plenum 50 includes a top layer or surface 70 and a bottom layer or surface 74 that cooperate to maintain an open space 58 defined therebetween. The top layer 70 and bottom layer 74 come into contact at the corrugations 64 to form a fluid connection and act as baffles 62. The corrugations 64 form channels 59 in the open space 58 when the top layer 70, bottom layer 74, or both flex, bend, or otherwise move. The top layer 70 and bottom layer 74 include support corrugations 68 that oppose each other. The support corrugations 68 each have a cross-section that is substantially half-octagonal.

Figure 4:
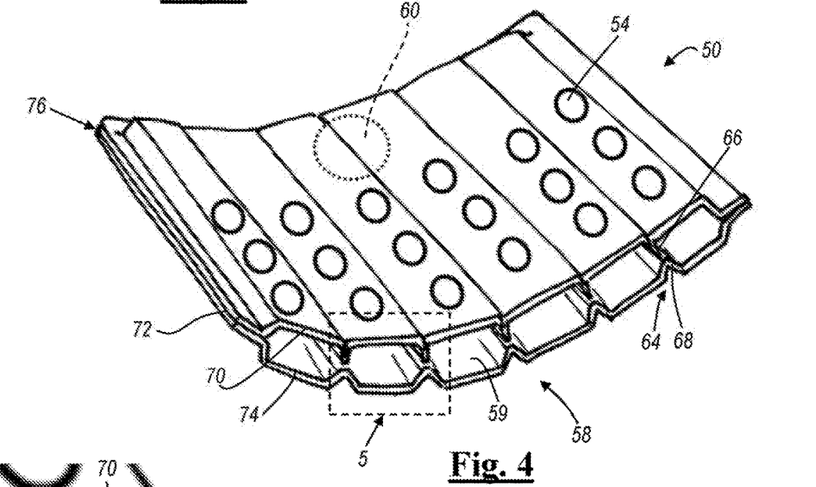
FIG. 4 is a perspective view of a plenum.

FIG. 4 is a cross sectional view of a plenum 50. The plenum 50 includes a top layer 70 and a bottom layer 74 that meet at the connection layer 72 to form a seam 76. The top layer 70 includes a plurality of ventilation holes 54 that create a fluid connection with the cushion holes (FIG. 1). The bottom layer 74 includes a connection recess 60 that creates a fluid connection with the blower (FIG. 1). The plenum 50 includes a plurality of corrugations 64. The top layer 70 includes a suspension corrugation 66. The bottom layer 74 includes a support corrugation 68. The suspension corrugation 66 and the support corrugation 68 form a corrugation channel 59 when an occupant (not shown) sits on the cushion 20 (FIG. 1) or when the top layer 70, the bottom layer 74, or both flex, bend, or move, which may be a result of an occupant sitting or moving in the seat or cushion. The suspension corrugation 66 and support corrugation 68 maintain an open space 58 when in contact. The corrugation channel 59 is inside of the open space 58. The open space 58 facilitates air flow between the connection recess 60 and the ventilation holes 54.

Figure 5:
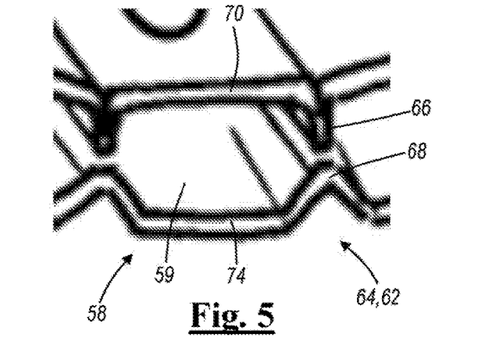
FIG. 5 is a close-up view of the cushion and the plenum of a distribution system in Box 5 in FIG. 4.

FIG. 5 is a close-up view of the open space 58 between the top layer 70 and bottom layer 74 in Box 5 of FIG. 4. Both the top layer 70 and the bottom layer 74 have one or more corrugations 64. More specifically, the top layer 70 includes one or more suspension corrugations 66 that are substantially pointed. In other words, the suspension corrugations 66 have opposing walls that are angled or taper at a peak, which may include a point or flat area, that points towards the bottom layer 74. The suspension corrugations 66 are pointed so the suspension corrugations 66 pivot as the top layer 70, bottom layer 74, or both flex. The bottom layer 74 includes one or more support corrugations 68 that are substantially half-octagonal. The half-octagonal shape of the support corrugations 68 is generally planar at the terminal end of each side that faces the top layer 70 and have substantially equal lengths to support the pointed end of the suspension corrugations 66 as the top layer 70, bottom layer 74, or both flex. The suspension corrugations 66 and support corrugations 68 are configured to come or bear into contact when the top layer 70, bottom layer 74, or both flex and act as baffles 62, which may occur when the cushion 20 is compressed, distorted, or otherwise moved when an occupant sits or moves in the seat 1. The suspension corrugations 66 create corrugation channels 59 when in contact. The open space 58 includes a plurality of corrugation channels 59 that are formed between the suspension corrugations 66 and support corrugations 68. Air or fluid is moved within these channels 59 to distribute air through the plenum 50 between the occupant and the air mover 80.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. An air distribution system comprising:
a plenum comprising:
 a. a top layer having one or more top layer corrugations;
 b. a bottom layer having one or more bottom layer corrugations; and
 c. an open space formed between the top layer and the bottom layer;
wherein the one or more top layer corrugations and the one or more bottom layer corrugations are spaced apart and oppose one another, and when the plenum flexes, the one or more top layer corrugations are configured to contact the one or more bottom layer corrugations to form one or more baffles that define one or more channels within the open space;
wherein the top layer and the bottom layer each include a respective longitudinal axis, and the bottom layer includes a connection recess and a terminal edge that are spaced apart along the longitudinal axis of the bottom layer, the connection recess is configured to connect a blower to the plenum, and the terminal edge is a farthest edge of the plenum from the connection recess; and
wherein the top layer includes one or more ventilation holes that are located between the one or more top layer corrugations and within the one or more channels.

2. The air distribution system of claim 1, wherein the one or more top layer corrugations, the one or more bottom layer corrugations, or both are substantially U-shaped, triangular, trapezoidal, octagonal, pointed edge, rounded edge, have a flat surface, terminate at a point, or a combination thereof.

3. The air distribution system of claim 1, wherein the one or more top layer corrugations, the one or more bottom layer corrugations, or both are flexible and allow the plenum to be curved around a cushion, a bolster, or both.

4. The air distribution system of claim 1, wherein the one or more top layer corrugations, the one or more bottom layer corrugations, or both are more rigid than the top layer, the bottom layer, or both.

5. The air distribution system of claim 1, wherein the one or more top layer corrugations, the one or more bottom layer corrugations, or both maintain a substantial U-shape, triangle, trapezoid, octagon, pointed edge, rounded edge, or a combination thereof when the top layer, the bottom layer, or both flex.

6. The air distribution system of claim 1, wherein the one or more top layer corrugations, the one or more bottom layer corrugations, or both are a suspension corrugation or a support corrugation that mate when the top layer, the bottom, layer, or both flex.

7. The air distribution system of claim 6, wherein the top layer includes the suspension corrugation and the bottom layer includes the support corrugation, and during the flexing of the top layer, the bottom layer, or both, the suspension corrugation is movable along the support corrugation and the support corrugation maintains support as the top layer, the bottom layer, or both flex.

8. The air distribution system of claim 6, wherein the suspension corrugation terminates at a point and the support corrugation has a planar surface.

9. The air distribution system of claim 6, wherein the top layer includes the support corrugation and the bottom layer includes the suspension corrugation.

10. The air distribution system of claim 6, wherein the support corrugation is planar, and the support corrugation on the top layer and the support corrugation on the bottom layer are mirror images of each other; and
wherein the support corrugation on the top layer and the support corrugation on the bottom layer come into contact with each other when the top layer, the bottom layer, or both flex.

11. The air distribution system of claim 6, wherein the suspension corrugation terminates at a point, and the suspension corrugation on the top layer and the suspension corrugation on the bottom layer are mirror images of each other; and wherein the suspension corrugation on the top layer and the suspension corrugation on the bottom layer come into contact with each other when the top layer, the bottom layer, or both flex.

12. The air distribution system of claim 1, wherein the one or more baffles have a shape that is straight, linear, free of curved portions, free of concave portions, free of sharp angles, or any combination thereof.

13. The air distribution system of claim 1, wherein the one or more channels, the one or more baffles, the one or more top layer corrugations, and the one or more bottom layer corrugations have a beginning end substantially near the connection recess and a terminal end at the terminal edge; and
wherein the one or more channels, the one or more baffles, the one or more top layer corrugations, and the one or more bottom layer corrugations are substantially parallel to each other along the longitudinal axis.

14. The air distribution system of claim 1, wherein the one of more top layer corrugations of the top layer and the one or more bottom layer corrugations maintain the open space between the one or more ventilation holes and the connection recess.

15. The air distribution system of claim 1, wherein the one or more top layer corrugations and the one or more bottom layer corrugations stack or mate together.

16. The air distribution system of claim 1, wherein the plenum includes one or more peripheries and the top layer, the bottom layer, and a connection layer attached only at the one or more peripheries so that the open space is maintained between the top layer and the bottom layer.

17. The air distribution system of claim 1, wherein the one or more top layer corrugations contact the one or more bottom layer corrugations to maintain the open space.

18. An air distribution system comprising:
a plenum comprising:
  a. a top layer having one or more top layer corrugations;
  b. a bottom layer having one or more bottom layer corrugations; and
  c. an open space formed between the top layer and the bottom layer;
wherein the one or more top layer corrugations and the one or more bottom layer corrugations are spaced apart and oppose one another, and when the plenum flexes, the one or more top layer corrugations contact the one or more bottom layer corrugations,
wherein the plenum is configured for connection to a rear side of a cushion of a vehicle seat,
wherein the top layer includes one or more ventilation holes, and the plenum comprises a connection recess for connecting an air mover to the plenum, and
wherein one or more channels are formed in the plenum after the one or more top layer corrugations contact the one or more bottom layer corrugations, the one or more channels are configured to facilitate an air flow generated by the air mover from the connection recess to the one or more ventilation holes.

19. The air distribution system of claim 18, wherein the top layer includes a suspension corrugation and the bottom layer includes a support corrugation, and during the flexing of the top layer, the bottom layer, or both, the suspension corrugation is movable along the support corrugation and the support corrugation maintains support as the top layer, the bottom layer, or both flex.

20. An air distribution system comprising:
a plenum comprising:
  a. a top layer having one or more top layer corrugations;
  b. a bottom layer having one or more bottom layer corrugations; and
  c. an open space formed between the top layer and the bottom layer;
wherein the one or more top layer corrugations and the one or more bottom layer corrugations are spaced apart and oppose one another, and when the plenum flexes, the one or more top layer corrugations contact the one or more bottom layer corrugations to form one or more baffles that define one or more channels within the open space;
wherein the top layer includes one or more ventilation holes, and the plenum comprises a connection recess for connecting an air mover to the plenum;
wherein one or more channels are formed in the plenum after the one or more top layer corrugations contact the one or more bottom layer corrugations, the one or more channels are configured to facilitate an air flow generated by the air mover from the connection recess to the one or more ventilation holes;
wherein the one or more top layer corrugations are a suspension corrugation and the one or more bottom layer corrugations are a support corrugation, the suspension corrugation terminates at a point and the support configuration has a planar surface;
wherein the suspension corrugation on the top layer comes into contact with the planar surface of the support corrugation when the top layer, the bottom layer, or both flex.

* * * * *

UNITED STATES PATENT AND TRADEMARK OFFICE
CERTIFICATE OF CORRECTION

PATENT NO. : 12,017,568 B2
APPLICATION NO. : 17/283595
DATED : June 25, 2024
INVENTOR(S) : Chad Vincent Pacilli et al.

Page 1 of 1

It is certified that error appears in the above-identified patent and that said Letters Patent is hereby corrected as shown below:

In the Claims

Column 17, Line 21, delete "of the top layer" after "layer corrugations"

Signed and Sealed this
Eighth Day of October, 2024

Katherine Kelly Vidal
*Director of the United States Patent and Trademark Office*